United States Patent
Sakoda (10) Patent No.: US 6,665,533 B1
(45) Date of Patent: Dec. 16, 2003

(54) COMMUNICATION SYSTEM, COMMUNICATION TERMINAL, AND INFORMATION DISTRIBUTION APPARATUS

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/546,253

(22) Filed: Apr. 10, 2000

(30) Foreign Application Priority Data

Apr. 9, 1999 (JP) .......................................... P11-102686

(51) Int. Cl.[7] .............................. H04Q 7/20; H04H 7/00
(52) U.S. Cl. ............................... 455/414.2; 455/414.1; 455/3.01; 455/422.1; 340/7.48
(58) Field of Search ............................. 455/414.1, 406, 455/413, 412.1, 414.2, 414.3, 517, 566, 3.01–3.06, 422.1; 340/7.48

(56) References Cited

U.S. PATENT DOCUMENTS

| | | | |
|---|---|---|---|
| 5,555,446 A | * | 9/1996 | Jasinski ...................... 455/414 |
| 5,870,030 A | * | 2/1999 | DeLuca et al. ........ 340/825.44 |
| 6,057,872 A | * | 5/2000 | Candelore ...................... 348/3 |
| 6,101,381 A | * | 8/2000 | Tajima et al. ................ 455/414 |
| 6,298,218 B1 | * | 10/2001 | Lowe ........................... 455/66 |
| 6,498,936 B1 | * | 12/2002 | Raith ........................... 455/466 |

FOREIGN PATENT DOCUMENTS

WO    WO 97/22066    * 6/1997 ........... G06F/17/21

\* cited by examiner

Primary Examiner—Duc M. Nguyen
(74) Attorney, Agent, or Firm—Jay H. Maioli (57) ABSTRACT

A communication system for broadcasting information of advertisements and other desired information to a plurality of terminals such as a cellular wireless communication system, wherein a common traffic channel (CTCH) for transmitting information to users of all terminals included in the system is defined other than a traffic channel (TCH) for separately transmitting information to the terminals. The specific information for the users is transferred via the traffic channel (TCH) on demand, while advertisements are distributed regularly to the terminals by the common traffic channel (CTCH). In a terminal, the advertising information is received and stored via the CTCH at the time of cell searching, and the advertising information is displayed during waiting periods such as when the terminal is being initialized, is in a state waiting for requested information, etc.

13 Claims, 9 Drawing Sheets

COMMUNICATION SYSTEM, COMMUNICATION TERMINAL, AND INFORMATION DISTRIBUTION APPARATUS

BACKGROUND OF THE INVENTION

1. Field of the Invention

The present invention relates to a communication system such as a cellular wireless communication system, more particularly a communication system capable of efficiently distributing advertisements and other information to users of a large number of terminals accommodated in the system, a communication terminal for the same, and an information distribution apparatus suitably used in such a communication system.

2. Description of the Related Art

In a broadcast system, one broadcast station distributes information to a large number of receiving stations at one time, so efficient distribution of advertisements is possible. Many broadcast systems distribute advertisements.

Figure 9:
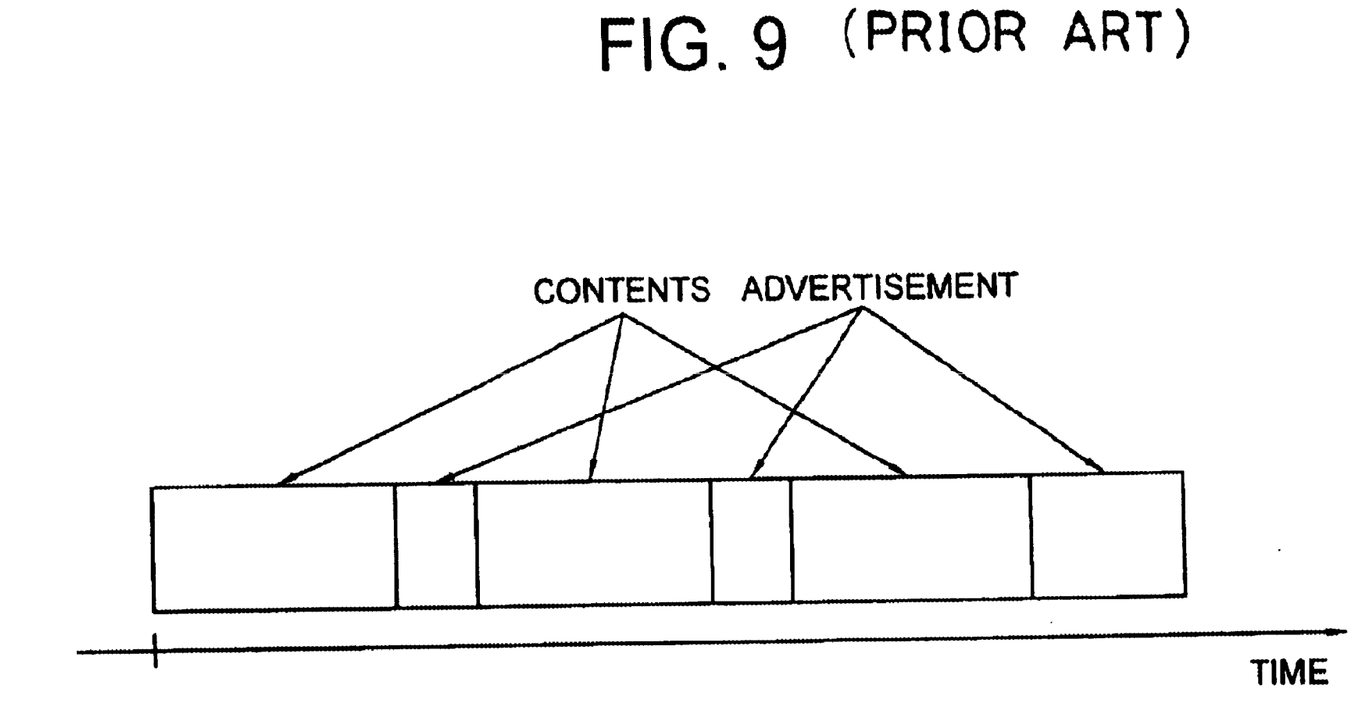
FIG. 9 is a view of a typical form of advertising distribution in an ordinary broadcast system.

A typical form of distribution of an advertisement in an ordinary broadcast system is shown in FIG. 9.

As shown in FIG. 9, a broadcast system of the related art generally inserts an advertisement between contents by time division in a channel providing an actual program (contents) so as to distribute the advertisement. This can be said to be a means used since there is no channel exclusively for advertisements and therefore the only method for sending advertisements to viewers has been forced insertion of advertisements between contents.

On the other hand, in a general communication system of the related art, the only broadcast information has been broadcasts of control information for securing communication paths. There has been no means of simultaneously distributing information to users.

For example, in a cellular wireless communication system, a broadcast control channel (BCCH) is used for broadcasts to terminals, but the content of the information transmitted by the broadcast control channel (BCCH) consists only of control information of system environment etc. Information directly relating to users is not transmitted.

Also, in the cellular wireless communication system of the related art and almost all other communication systems, there is no defined user information channel common for a plurality of terminals. Information is transferred in units of terminals in a traffic channel (TCH) giving access rights to a specific terminal.

There is demand for simultaneously distributing for example advertisements and other information to cellular phones and other terminals of cellular wireless communication systems and to computers connected to a network. If it were possible to simultaneously distribute desired information to such communication terminals, this could be utilized as an effective advertisement medium and, furthermore, the users of the communication terminals could expect to receive information of a form different from that of ordinary communication and take advantage of a communication charging system set considering reception of advertisements, thereby enabling a wireless communication system to be more effectively used.

In the communication system of the related art, however, there is nothing like a package broadcast traffic channel for users of all terminals defined. The channel configuration does not even allow any experiments for efficient distribution of advertisements.

Further, broadcast systems broadcast advertisements, but there is no channel provided exclusively for advertisements. Therefore, the only way to distribute advertisements is to temporarily suspend transmission of information content on the physical channel transmitting the information contents and insert them time-wise. This cannot be applied immediately to communication systems.

Namely, the general communication systems of the related art have not been able to distribute information such as advertisements. No such attempts have been made either.

Specifically, immediately after turning on for example a communication terminal, a computer, etc., there is certain waiting time before the environment is set up. This period is perfect for displaying advertisements to users. There have been requests for displaying advertisements during this time, however, the contents displayed during this time are usually always fixed. Advertisements and other information are not being displayed.

Also, when for example browsing the web, there is a waiting time while information is being downloaded. This time can be also considered a perfect time for displaying advertisement in the same way, but there is no system displaying advertisements using this time.

SUMMARY OF THE INVENTION

An object of the present invention is to provide a communication system capable of broadcasting desired advertisements and other information to a large number of unspecified terminals.

Another object of the present invention is to provide a communication terminal, to be used in such a communication system, capable of receiving broadcasted information and suitably displaying it to the user.

Still another object of the present invention is to provide an information distribution apparatus capable of broadcasting for example advertisements and other desired information to a large number of unspecified terminals.

Therefore, a communication system of a present invention comprises a host system, a plurality of terminals, a communication channel for communicating between said host system and said terminal and between said plurality of terminals, and a distribution channel for broadcasting a signal having a content from said host system to said plurality of terminals.

Preferably, the communication system of the present invention further comprises a control channel for transferring information regarding predetermined control processing for suitable communication between said host system and said plurality of terminals.

Further preferably, said host system comprises a server apparatus for storing a information and transmitting in accordance with requests from said terminals the requested information to the terminal and said plurality of terminals substantially use said distributed signal including a content at least while waiting for transmission of said requested information from said server apparatus.

Further preferably, said plurality of terminals notify said host system of information regarding usage of said distributed signal when substantially using a signal distributed via said distribution channel.

Specifically, a plurality of types of signals each including a content are multiplexed and broadcasted over said distribution channel.

Further specifically, said communication system comprises a cellular wireless communication system, said plurality of terminals comprise cellular wireless communication terminals, said host system comprises a base station, and said base station and said cellular wireless communication terminals are connected by a plurality of channels including a control channel for transferring information for predetermined control processing, a communication channel for communication between said cellular wireless communication terminals, and a distribution channel for broadcasting a signal each including a content to said cellular wireless communication terminals.

Further a communication terminal of the present invention is a terminal for use in a communication system comprising a host system and a plurality of terminals connected said host system, comprising a channel means connected to said host system and including a first channel for desired communication and a second channel for distribution of a signal including a content to be broadcast, a receiving means for receiving said signal including a content via said second channel, a storage means for storing said received signal including a content, an output means for outputting a signal in a predetermined form, and a control means for making said output means output said signal stored in said storage means in a predetermined period.

Preferably, said control means makes said output means output said signal stored in said storage means while the communication terminal is processing and waiting for a new operation.

Further preferably, said control means makes said output means output said signal stored in said storage means while the communication terminal is waiting to receive a information by a communication via said first channel.

Further preferably, said communication terminal has an off state, a stand-by state, and an active state, and said receiving means receives said distributed signal including a content when the communication terminal is in a stand-by state.

Further preferably, the communication terminal of the present invention further comprises an output notification means for notifying information regarding usage of said distributed signal to said host system when said distributed signal is output from said output means.

Specifically, said distributed signal comprises a signal obtained by multiplexing a plurality of types of signals each including a content and said receiving means demultiplexes said multiplexed plurality of signals and selects a signal by a predetermined method.

Further specifically, said communication terminals comprises cellular wireless communication terminals.

Further, an information distribution apparatus of the present invention a communication channel for desired communication between said plurality of terminals, a distribution channel for broadcasting a signal including a content to said plurality of terminals, a distribution means for broadcasting said signal to said plurality of terminals via said distribution channel, a receiving means for receiving information, regarding a state of use of said signal distributed via said distribution channel, transmitted from said terminals, and a processing means for predetermined processing based on said information regarding the state of use of said received signal.

Specifically, said distribution means multiplexes and broadcasts a plurality of types of signals each including a content.

Further specifically, said signal comprises a signal including advertising information, and said processing means carries out processing for totaling up the state of viewing of said advertising information at said terminals.

Further specifically, said signal comprises a signal including advertising information, and said processing means carries out processing for totaling up the state of viewing for each said advertising information.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

An embodiment of the present invention will be explained with reference to FIGS. 1 to 8.

In the present embodiment, the present invention will be explained with reference to example of simultaneously sending an advertisement to terminals in a mobile-body wireless communication system such as a cellular wireless communication system.

First, the network configuration of the cellular wireless communication system of the present embodiment will be explained with reference to FIG. 1.

Figure 1:
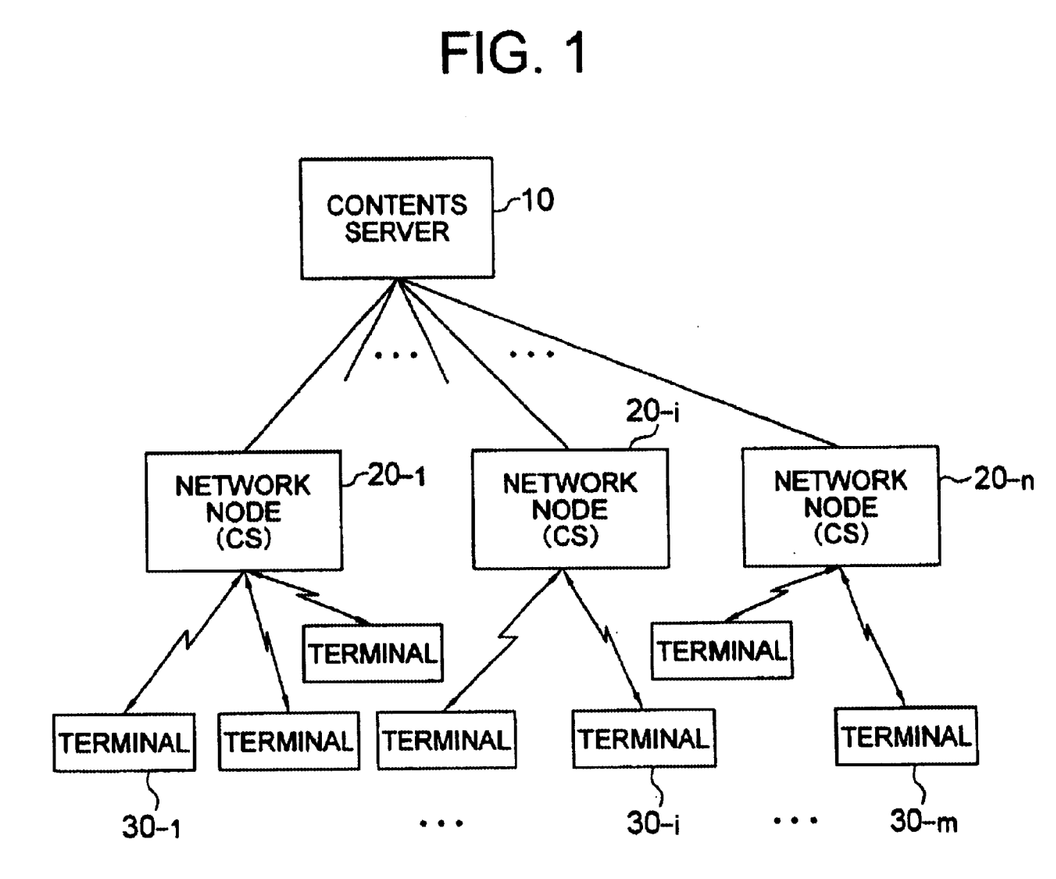
FIG. 1 is a view of the configuration of a network of a cellular wireless communication system of an embodiment of the present invention.

FIG. 1 is a view of the configuration of a network of a cellular wireless communication system of the present embodiment.

A cellular wireless communication system 1 of the present embodiment is configured by a contents server 10, a plurality of network nodes $20_{-1}$ to $20_{-n}$, and a plurality of terminals $30_{-1}$, to $30_{-m}$ arranged hierarchically as shown in FIG. 1. The desired information including a text data, image data, and audio data is transmitted and the advertising information is distributed from the contents server 10 to the terminals $30_{-j}$ (j=1 to m) via the network nodes $20_{-1}$ (i=1 to n).

Note that in the cellular wireless communication system 1, the network nodes $20_{-1}$ to $20_{-n}$ correspond to cell sites CS, MTSO (mobile telephone switching offices), etc. Accordingly, communication between the network nodes $20_{-i}$ and the terminals $30_{-j}$ is maintained under the control of an existing cellular wireless communication system.

Note that the network nodes $20_{-j}$ will be also referred to as CS's $20_{-i}$ in the following explanation.

The parts of the cellular wireless communication system 1 will be explained in detail below.

The contents server 10 stores the desired information and advertising information to be distributed. The information is appropriately distributed in accordance with need or a predetermined schedule. Specifically, the contents server 10 is comprised by, for example, a work station, file server, etc. having a communications interface.

The network nodes $20_{-i}$ are relays for substantially connecting the contents server 10 and the terminals $30_{-j}$ in accordance with a predetermined network topology. In FIG. 1, the layers of the network nodes $20_{-i}$ serving as the relay layers are made one layer for simplifying the illustration, but an actual cellular wireless communication system 1 is configured to have a plurality of layers.

The network nodes $20_{-i}$ suitably distribute requests for distribution of information from the terminals $30_{-j}$ to the contents server 10, information from the contents server 10 to the terminals $30_{-j}$, etc.

The terminals $30_{-j}$ are cellular phone type terminals in the cellular wireless communication system 1 of the present embodiment. Users use them to request distribution of information from the contents server 10, receive the requested information and advertising information, or communicate with each other.

The configuration of the terminal $30_{-j}$ will be explained in detail with reference to FIG. 2.

Figure 2:
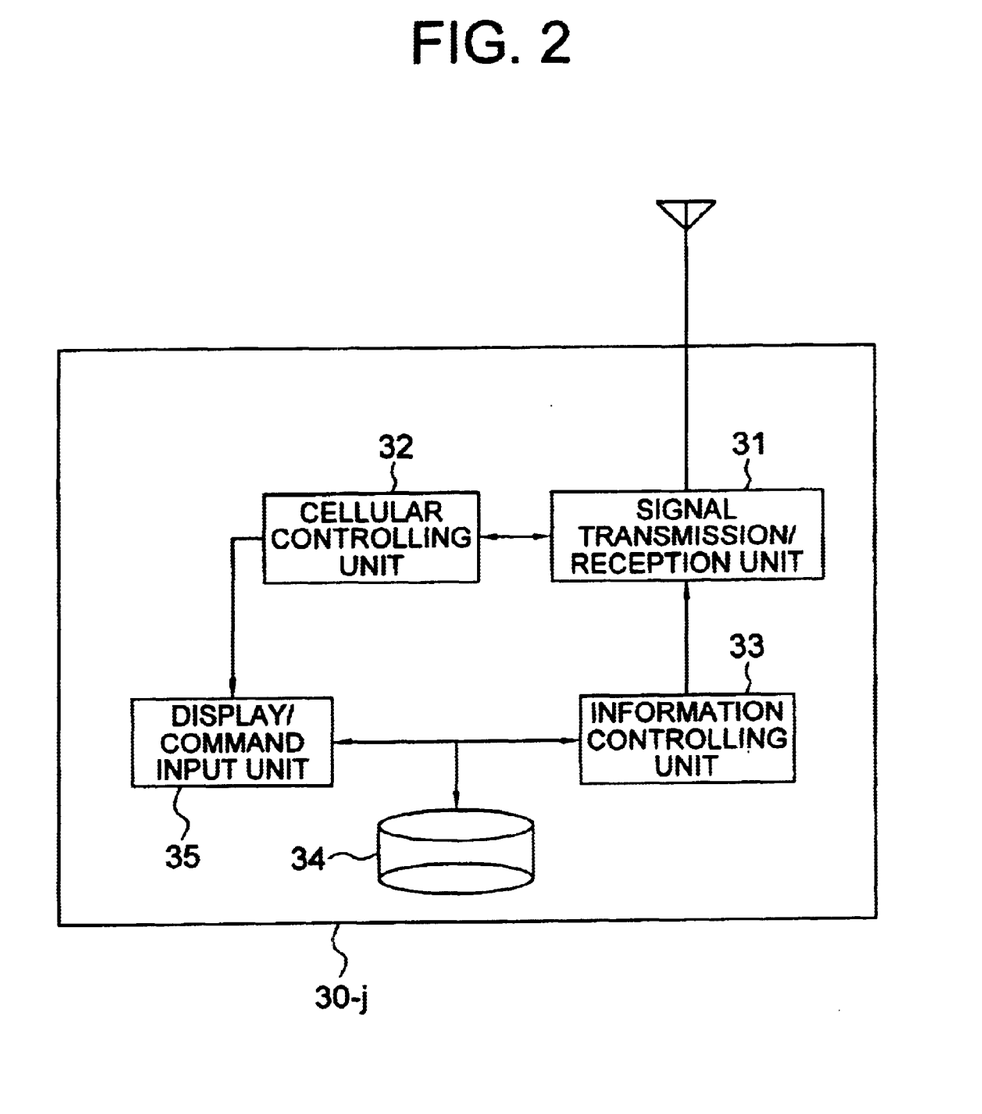
FIG. 2 is a block diagram of the configuration of a terminal of the cellular wireless communication system shown in FIG. 1.

FIG. 2 is a block diagram of the configuration of one of the terminals $30_{-j}$.

The terminal $30_{-j}$ comprises a signal transmitter/receiver 31, cellular controller 32, information controller 33, storage 34, and a display/command input unit 35.

The signal transmitter/receiver 31 is a circuit for signal processing for actual communication with a base station and generates a communication signal of a desired protocol and transmits the same under the control of the cellular controller 32. Also, the signal transmitter/receiver 31 decodes a received signal to a predetermined baseband signal under the control of the cellular controller 32 and outputs the result to the information controller 33.

The cellular controller 32 controls the signal transmitter/receiver 31 so that the terminal $30_{-j}$ can suitably communicate in accordance with a predetermined protocol and supports the parts of the terminal $30_{-j}$ so as to suitably maintain state of the terminal $30_{-j}$ relating to communication by functions provided to the communication system. For example, the cellular controller 32 carries out a cell search for detecting whether it is in or out of a communication zone, whether it is in an area capable of communicating with its base station, etc. and outputs the results to the display/command input unit 35.

The information controller 33 processes the information received via the signal transmitter/receiver 31 and information set by the user via the display/command input unit 35.

The information controller 33 generates data for requesting to distribute desired information based on the operation of the user and outputs it to the signal transmitter/receiver 31.

Also, the information controller 33 stores in the storage 34 a variety of notification information and advertising information received from the contents server 10 and displays the same on the display/command input unit 35 so that the user can confirm it.

The storage 34 is a small size storage storing desired information transmitted from the contents server 10, advertising information to be suitably distributed, or information set by the user via the display/command input unit 35 and is accessed as needed by the information controller 33. Specifically, the storage 34 is realized by a small size hard disk drive (HDD), an MD, a re-writeable CD, a compact MO, etc.

The display/command input unit 35 is an interface between internal circuits of the terminal $30_{-j}$ and the user and comprises a liquid crystal display panel for displaying information to the user, a speaker for audio output of the information, and a keyboard for the user to operate.

Next, the processing at the time of basic information distribution in such a cellular wireless communication system 1 will be explained with reference to FIG. 3.

Figure 3:
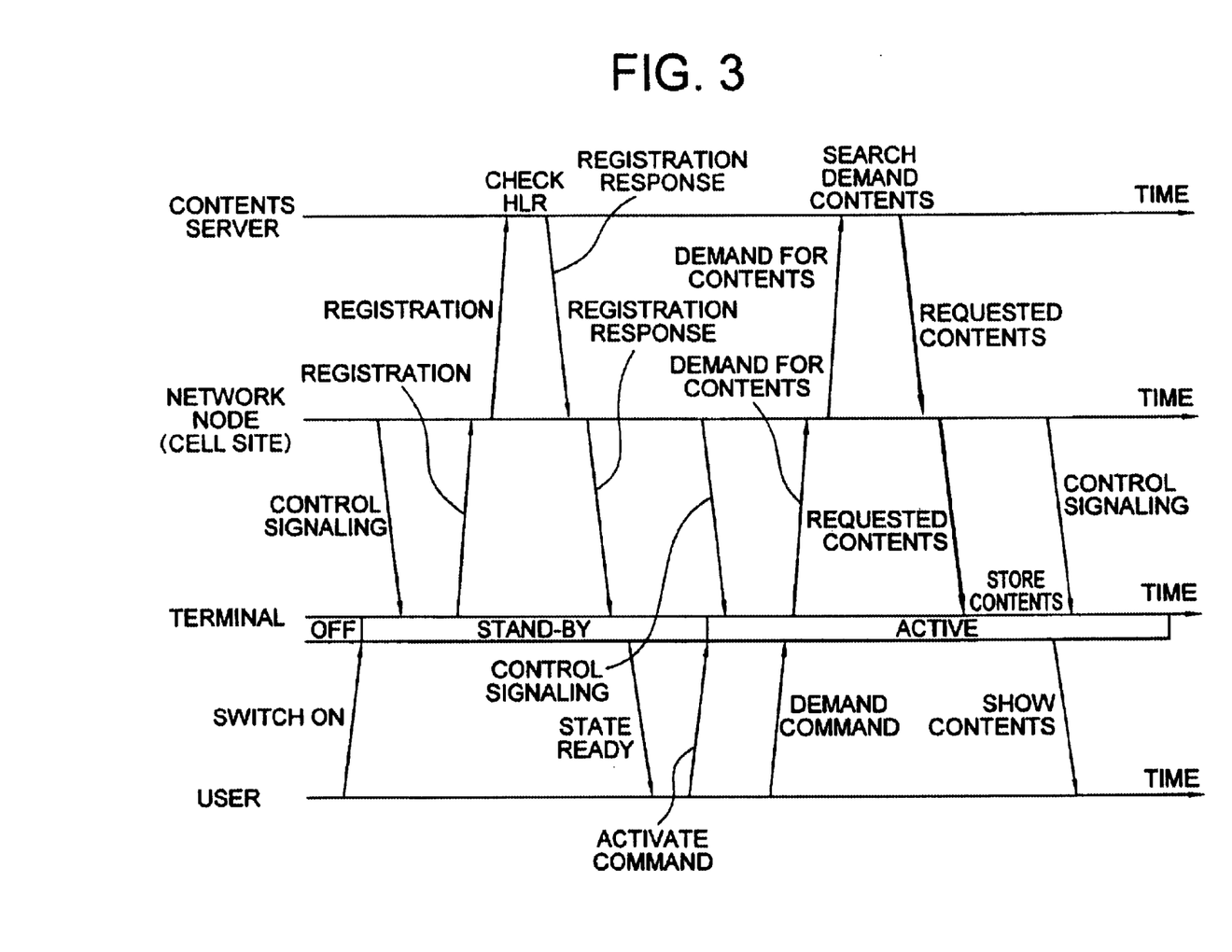
FIG. 3 is a view of a basic information distribution procedure in the cellular wireless communication system shown in FIG. 1.

FIG. 3 is a view of a basic information distribution procedure in the cellular wireless communication system 1.

First, a user turns on a switch of a terminal $30_{-j}$, and the state of the terminal $30_{-j}$ changes from an off state to a stand-by state.

In the stand-by state, the terminal $30_{-j}$ attempts to receive information of a broadcast control channel (BCCH) transmitted from a nearby CS $20_{-i}$ to obtain information on which network node (CS) $20_{-i}$ it should communicate with etc. The CS's $20_{-i}$ in the system transmit information at all times. The terminal $30_{-j}$ judges whether it can connect to the network at that location and frequency channel by receiving this.

Note that the cellular wireless communication system 1 of the present invention 1 receives advertisements from another channel at this time, but the specific operations and processing of the present invention will be explained in detail later on. The basic processing will be explained here.

As a result, when the terminal judges that it can connect to the network, it sends information required for position registration and acknowledgment etc. needed therefor to the CS $20_{-i}$ via a random access channel (RACH) (registration).

Upon receiving the information, the CS $20_{-i}$ forwards the received information to the contents server 10 or an HLR (home location register) around it (registration).

The HLR checks the transferred information and confirms that it is suitable information from the terminal $30_{-j}$ (check). After confirmation, it notifies the terminal $30_{-j}$ via the CS $20_{-i}$ that the registration has been completed (registration response).

Upon receiving this, the terminal $30_{-j}$ provides information indicating that it can be connected to the system to the user using an LED, sound, etc. (state ready). Note that in the stand-by state, the terminal $30_{-j}$ is activated only at the minimum parts required for communication with the CS $20_{-i}$. For example, when the terminal $30_{-j}$ has a liquid crystal screen, the liquid crystal screen is turned off.

The user carries out a predetermined operation to activate the terminal (active command), and the terminal $30_{-j}$ changes to an active state, supplies power to the liquid crystal screen etc. for the first time after being activated, and enters a state capable of receiving a variety of commands from the user.

When a command to the effect that a user desires specified information (demand command) is input by the user in the active state, the terminal $30_{-j}$ first checks whether the required information is stored in the storage 34 provided in itself. When it is stored, it reads the information from the storage 34 and provides it to the user. When the required information is not stored, the terminal $30_{-j}$ transmits a request for information (demand for contents) to the CS $20_{-i}$ for requesting that the contents server 10 provide the information.

Upon correctly receiving this, the CS $20_{-i}$ further forwards or transfers it to the contents server 10 (demand for contents). The contents server 10 searches for and extracts the requested information (requested contents) and provides it to the requesting terminal $30_{-j}$.

The terminal $30_{-j}$ receives the information from the CS $20_{-i}$ via a traffic channel (TCH) and stores the same in the storage 34 once. When the storing operation is completed, it provides the received information to the user using the liquid crystal screen, sound, etc. (show contents).

Note that even during such processing, the CS's $20_{-i}$ are transmitting information of the broadcast control channel (BCCH) (control signal). The terminal $30_{-j}$ receives the same and thereby judges whether it can connect to the network at that location and frequency channel.

Next, the processing at the time of distributing advertisements in the cellular wireless communication system 1 of such a configuration and operations will be explained with reference to FIGS. 4 to 7.

Figure 4:
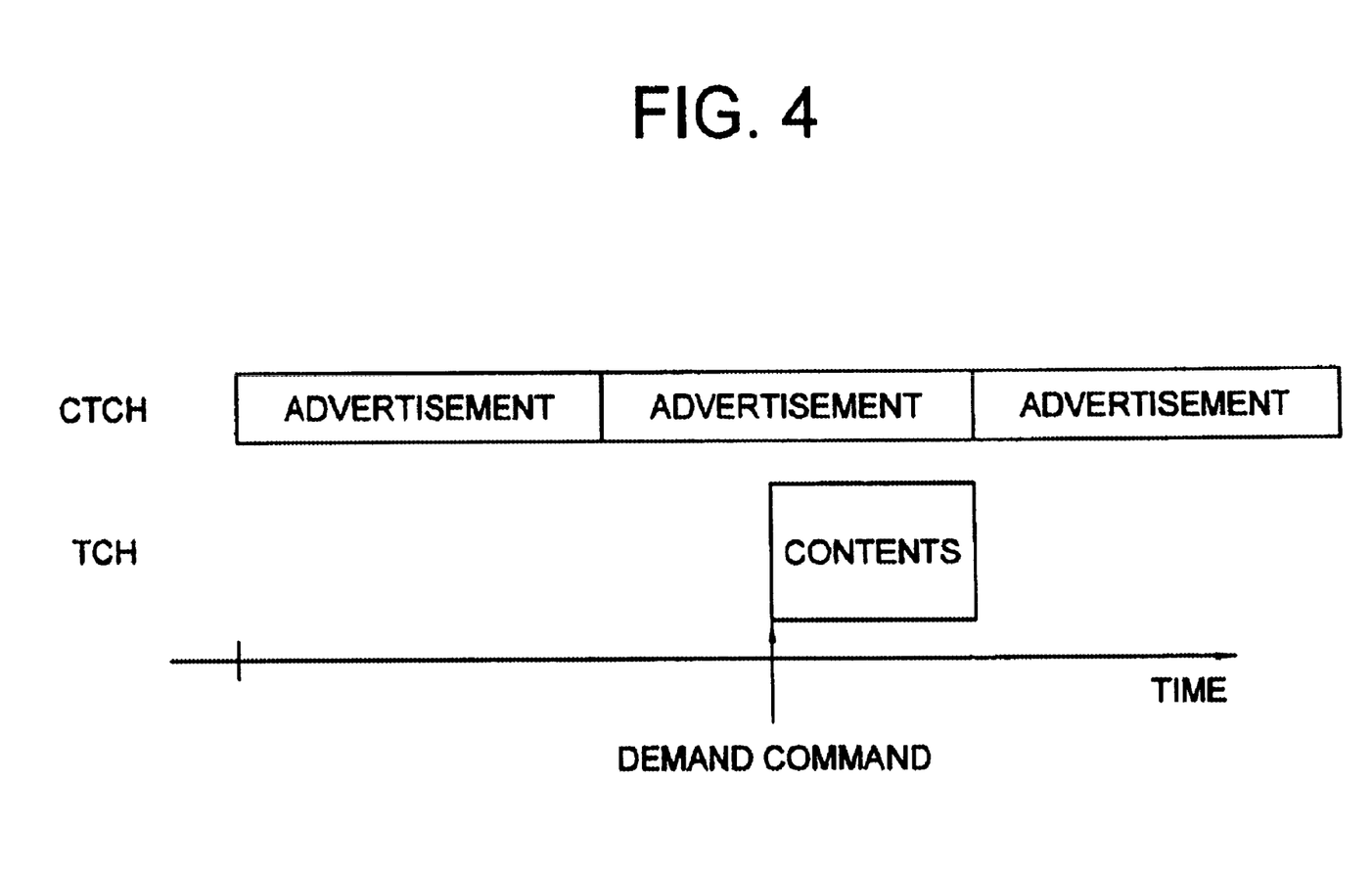
FIG. 4 is a schematic view of a method of distributing advertisements and other information to a large number of unspecified users and a state of a channel at that time in the cellular wireless communication system shown in FIG. 1.

FIG. 4 is a schematic view of a method of distributing advertisements and other information for a large number of unspecified users (hereinafter simply referred to as "advertisements") in the cellular wireless communication system 1 and the state of the channel at that time.

In the cellular wireless communication system 1, other than the traffic channel (TCH) for separately transmitting information to the users at the respective terminals $30_{-j}$, a comon traffic channel (CTCH) for transmitting information to users of all terminals $30_{-j}$ in the system is defined.

Specific information for the users is transferred on demand as before via the traffic channel (TCH), while advertisements are periodically distributed from the CS's $20_{-i}$ not via the traffic channel (TCH) but by the common traffic channel (CTCH).

Accordingly, the distribution of advertisements does not interfere with the traffic channel (TCH).

Also, the terminal $30_{-j}$ counts and stores in the storage 34 the date the advertisement was received over the common traffic channel (CTCH), the ID number of the CS $20_{-i}$ transmitting the advertisement, the number of times and the time the advertisement was displayed/reproduced for the user, etc.

The information is delivered to the network side attached as advertisement reception history information when the terminal $30_{-j}$ transmits position registration, acknowledgment, etc., and other control information required for connection with the existing network, namely, at the time of the cell search.

The information is received by the contents server 10 via a CS $20_{-i}$. The contents server 10 compiles this information for every terminal $30_{-j}$ or for all terminals $30_{-j}$.

As a result, the contents server 10 can determine to how many users and how frequently advertisements broadcasted to large numbers of unspecified users over the common traffic channel (CTCH) were displayed/reproduced.

Accordingly, a network operator can collect fees for advertisement from advertising agents and clients based on the display/reproduction history of the advertisements.

The processing at the time of distributing advertisements in such a cellular wireless communication system 1 will be explained with reference to FIG. 5.

Figure 5:
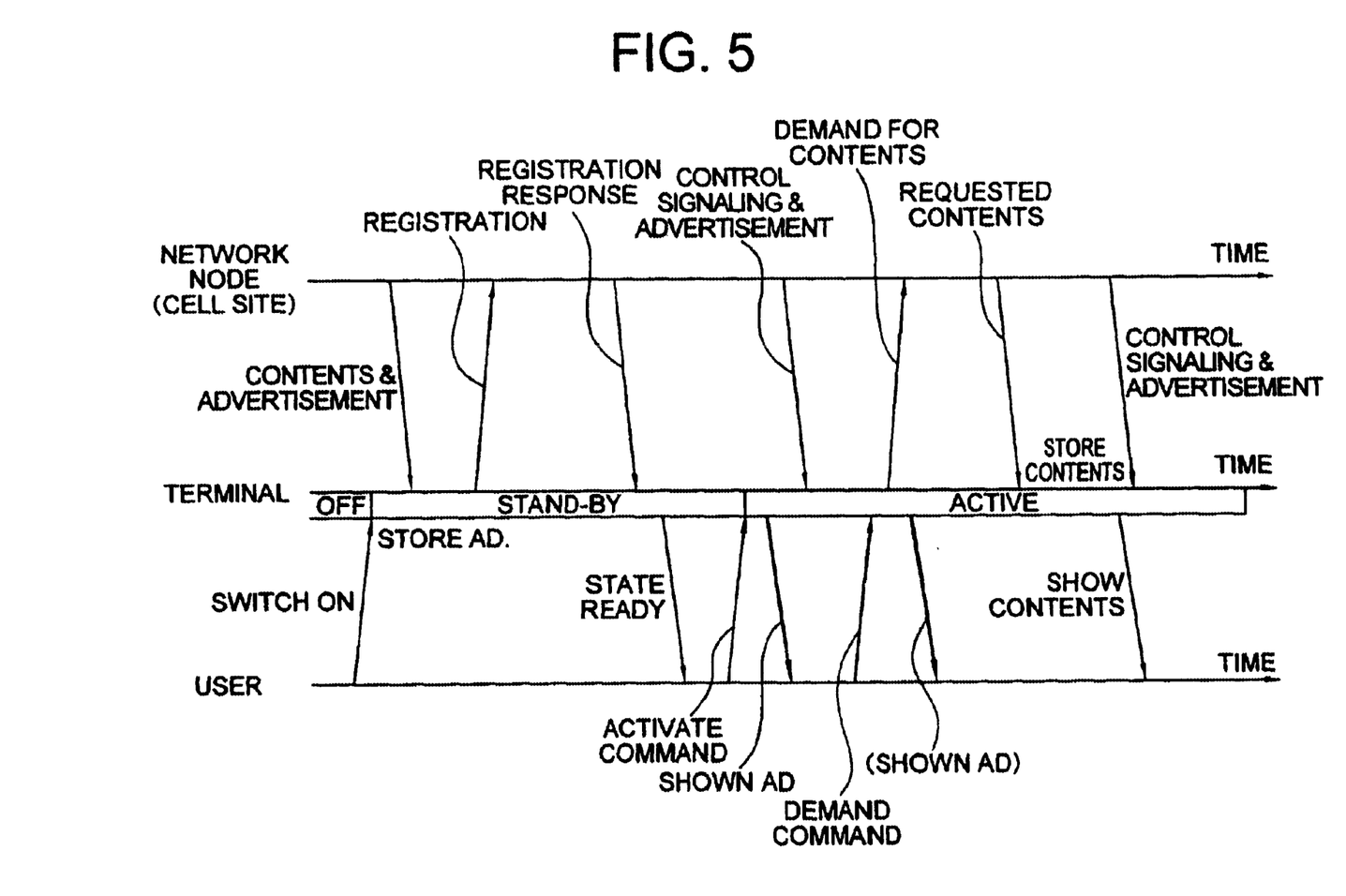
FIG. 5 is a view of an information distribution procedure in a case of receiving desired information, including distribution of advertising information, in the cellular wireless communication system shown in FIG. 1.

FIG. 5 is a view of a procedure for distribution of advertising information in the cellular wireless communication system 1.

Note that the explanation will be made by focusing on the reception and display of advertising information in a terminal $30_{-j}$ here. Accordingly, processing higher than the CS's $20_{-i}$, that is, processing relating to the contents server 10, is omitted in FIG. 5.

First, the user turns on a switch of a terminal $30_{-j}$, and the terminal $30_{-j}$ changes from an off state to a stand-by state.

The terminal $30_{-j}$ in the stand-by state receives information of a broadcast control channel (BCCH) and tries to connect to the network as explained above. The terminal $30_{-j}$ receives a common traffic channel (CTCH) from the broadcast control channel (BCCH), receives an advertisement distributed by the common traffic channel (CTCH), and stores it in the storage 34 provided inside its own terminal.

Then, in the same way as above, the terminal $30_{-j}$ which received the broadcast control channel (BCCH) transmits the necessary information to an HLR via the CS $20_{-i}$ (registration). The HLR confirms the information is from a suitable terminal $30_{-j}$. The fact that the registration has been completed is transmitted to the terminal $30_{-j}$ via the CS $20_{-i}$ (registration response). Processing indicating that the terminal $30_{-j}$ is in a connection-ready state (state ready) is then carried out.

When the user carries out a predetermined operation to activate the terminal $30_{-j}$ (active command), the terminal $30_{-j}$ simultaneously sets the environment and carries out other initialization. The terminal $30_{-j}$ automatically provides the user with the advertising information received and stored in the storage 34 by a liquid crystal screen, sound, etc. (show ad).

As a result, the user views the advertising information while the terminal $30_{-j}$ is initializing.

When the user inputs a command demanding specified information to the terminal $30_{-j}$ (demand command), as explained above, the terminal $30_{-j}$ checks whether the information is stored in the storage 34 and, when it is not stored, transmits a request for information (demand for contents) to the CS $20_{-i}$. In this case, the request for information is further forwarded to the contents server 10, the information (requested contents) is searched in the contents server 10, provided to the terminal $30_{-j}$ via the CS $20_{-i}$, stored in the storage 34 (store contents), and provided to the user in a viewable way (show contents).

When the information requested by the user is being downloaded from the contents server 10, the terminal $30_{-j}$ again provides the user with the advertising information stored in the storage 34 via a liquid crystal screen, sound, etc. Note that when providing the advertising information during the waiting time, the remaining time until the completion of the information transfer is also provided to the user.

Namely, the user views the advertising information during the waiting time for the requested information to be downloaded.

The terminal $30_{-j}$ ends the display/reproduction of the advertisement as soon as the storing of information transmitted via the traffic channel (TCH) in the storage 34 (store contents) has been completed and then starts to display/reproduce the information stored in the storage 34 (show contents).

Note that even during such processing, information of the broadcast control channel (BCCH) (control signaling) and advertising information (advertisement) distributed by the common traffic channel (CTCH) are transmitted from the CS's $20_{-i}$. The terminal $30_{-j}$ receives the same and judges whether it can connect to the network at that location/frequency channel. Also, it stores the distributed advertising information in the storage 34 provided in it.

Accordingly, the successively viewed advertisements, that is, the advertisement viewed during initialization of the terminal $30_{-j}$ and the advertisement viewed during the waiting time for downloading in the example shown in FIG. 5, become different.

Figure 6:
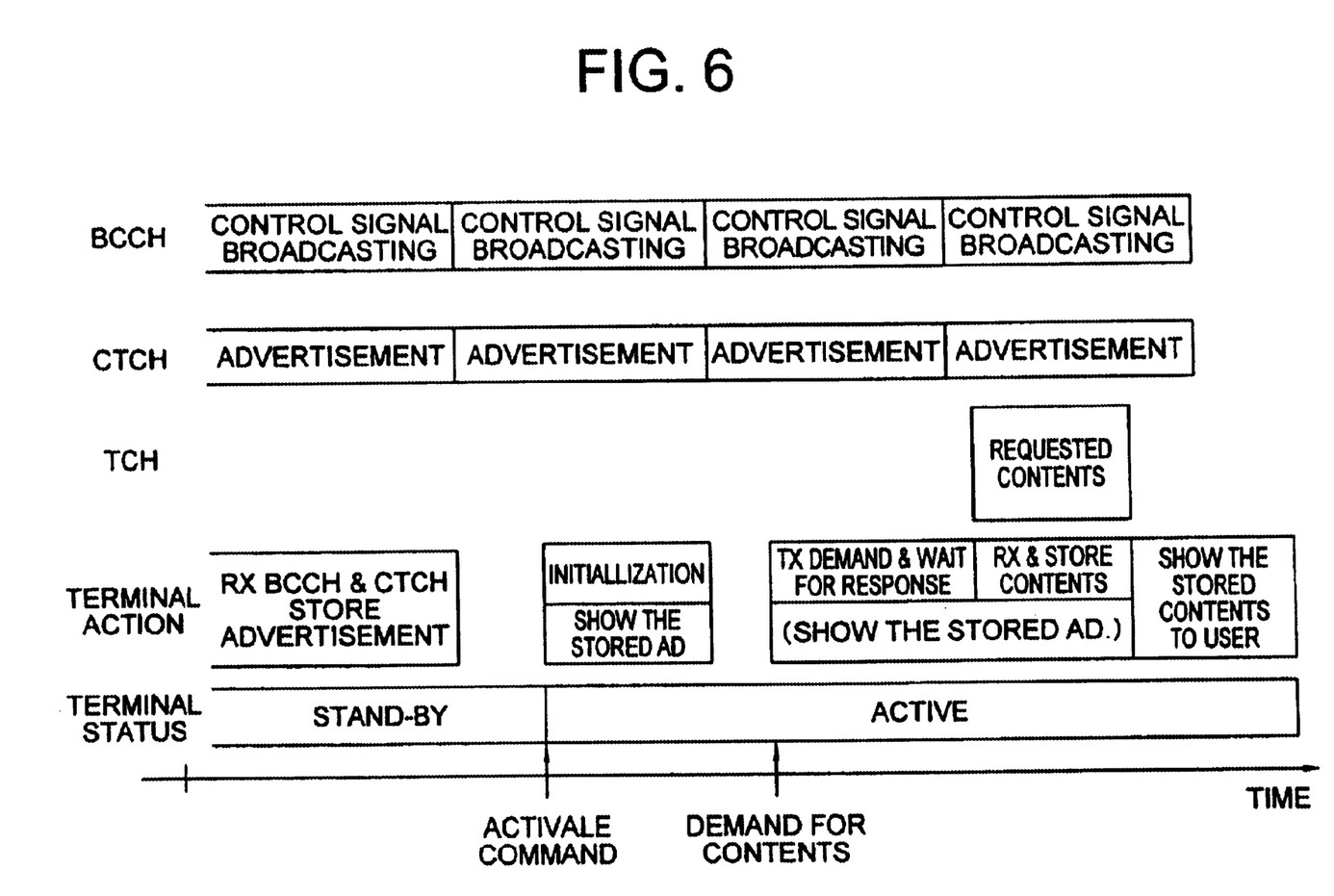
FIG. 6 is a view of contents of logic channels and a state of a terminal when communicating by the procedure shown in FIG. 5.

The contents of the logic channels and state of the terminal $30_{-j}$ at the time of such processing are schematically shown in FIG. 6.

The common traffic channel (CTCH) is configured by frames at timings the same as in the broadcast control channel (BCCH) or synchronized with the broadcast control channel (BCCH). These are received while the terminal $30_{-j}$ is in a stand-by state. When the terminal $30_{-j}$ is activated, as explained above, the advertisement stored during the stand-by state is displayed/reproduced to the user while the terminal itself is being initialized.

Furthermore, when downloading information from the contents server 10, advertising information is provided to the user via a liquid crystal screen, sound, etc. during the waiting time from transmission of a request for information until the information is transmitted via the traffic channel (TCH) and during the reception of the same.

Figure 7:
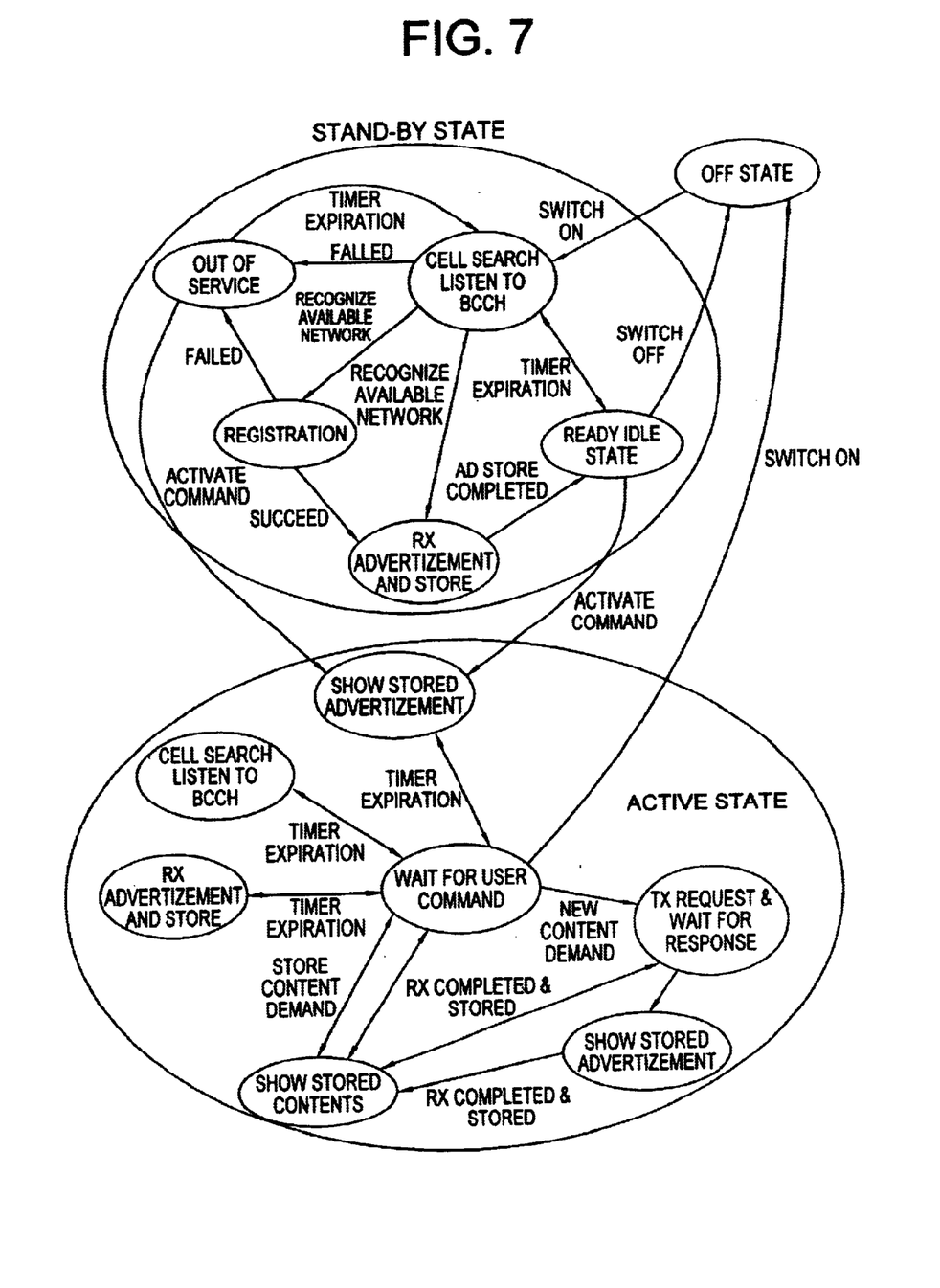
FIG. 7 is a view of the state of change for explaining processing in the terminal shown in FIG. 1.

The processing in the terminal $30_{-j}$ during such processing will be explained with reference to this change in state.

FIG. 7 is a view of the change (transition) in state in a terminal $30_{-j}$ of the present invention.

The terminal $30_{-j}$ changes from a power off state (off state) to a stand-by state by being supplied with power, carries out a cell search to confirm to which CS $20_{-i}$ it should connect, and receives a broadcast control channel (BCCH) transmitted by that CS $20_{-i}$.

At this time, when a suitable CS $20_{-i}$ is not found or the broadcast control channel (BCCH) cannot be correctly received (failed), the terminal changes to an out-of-service state indicating it currently is unable to receive provided information. When entering this state, it again starts a cell search after waiting for a certain period of time by a timer (timer expiration).

When the terminal correctly receives the broadcast control channel (BCCH) (recognize available network), it registers its position and acknowledges reception (registration). As a result, when failing in registration, the terminal enters an out-of-service state, while when succeeding in the registration, it receives a common traffic channel (CTCH) and stores the received advertisement in the storage 34 (RX advertisement and store). Note that reception and storage of the advertisement are carried out directly from the cell searching state without registering.

When the storing of the advertisement is completed (ad store completed), the terminal enters an idle state (ready idle state).

When entering an idle state, a timer starts to operate and cell searching is carried out at predetermined time intervals (time expiration).

When a command to shift to an active state (active command) is input by the user in the idle state or in the out-of-service state, the terminal $30_{-j}$ enters an active state.

The terminal $30_{-j}$ shifted to an active state shows the advertisement to the user (show stored advertisement), then enters a state waiting for a command from the user (watt for user command).

Here, when a command indicating information contents already stored in the storage 34 are input (stored content demand), the terminal $30_{-j}$ immediately extracts and shows the content (show stored contents), then returns to a state waiting for a command from the user.

When information contents not stored in the storage 34 are input (new content demand), the terminal $30_{-j}$ shows an advertisement to the user (show stored advertisement) as transmitting a request for information to the contents server 10 (TX request & wait for response). When the requested information is all stored in the storage 34 (RX completed & stored), the terminal $30_{-j}$ shows the information to the user.

Further, when there is no command input by the user for a predetermined period of time (time expiration) in a state waiting for a command from the user, an advertisement stored in the storage 34 is displayed to the user in some cases.

Note that advertisements are basically received in the stand-by state. When there is no command input from the user for a predetermined period of time in the state waiting for a command from the user (time expiration), advertisements may be received by a common traffic channel (CTCH) (RX advertisement and store).

Also, In the state waiting for a command from the user, a terminal carries out a cell search at predetermined time intervals.

As explained above, in the cellular wireless communication system 1 of the present embodiment, it becomes possible to effectively distribute advertisement—something which has been impossible so far.

Also, by using such a system, for example, it becomes possible for a network operator to increase the advertising income.

Further, due to this, the cost charged to the user of the terminal is reduced, a larger number of people can become users, and large economic effects can be obtained.

Note that the present invention is not limited to the above embodiments and a variety of modifications can be made.

For example, as advertisements distributed by the common traffic channel (CTCH), in the above embodiment, an example was described where the same advertisement was continuously distributed, however, a plurality of advertisements may be distributed multiplexed.

Figure 8:
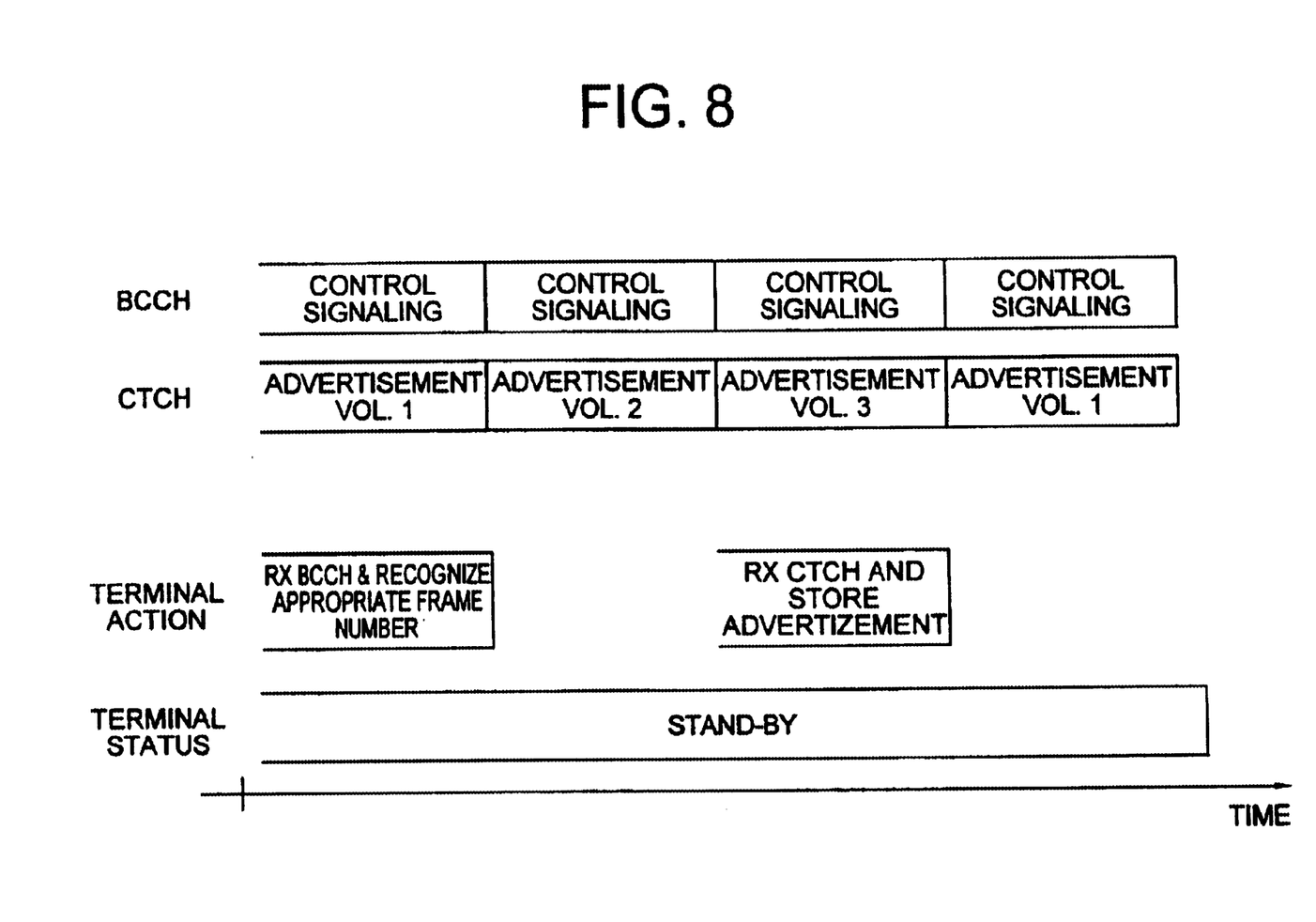
FIG. 8 is a view of contents of logic channels and a state of a terminal when multiplexing information of a plurality of advertisements for distribution.

The contents of the logic channels in such a case are shown in FIG. 8.

In the example shown in FIG. 8, contents of three advertisements are multiplied by time division in the common traffic channel (CTCH).

A variety of methods can be considered for selecting an advertisement to be displayed from such a plurality of advertisements. Here, however, a terminal $30_{-j}$ is assigned an attribute in advance of which kind of common traffic channel (CTCH) to receive in accordance with its user. The terminal $30_{-j}$ assigns priorities to the advertisements in accordance with this attribute to select one of the advertisements.

Since the broadcast control channel (BCCH) broadcasts where various advertisements can be received, the terminal $30_{-j}$ need only receive the broadcast control channel (BCCH) to obtain the information, then receive an advertisement in accordance with the priority.

In the example in FIG. 8, the terminal $30_{-j}$ gives he highest priority to the Vol. 3 in its attribute and receives only the Vol. 3 advertisement.

Note that the method of multiplexing a plurality of advertisements directed at a large number of unspecified users is not limited to the time-division multiplexing as shown in FIG. 8. The methods of frequency-division multiplexing, code multiplexing, etc. may be used.

Also, various forms of the method of display based on priority may be considered.

For example, it is possible to change the frequency of display/reproduction for a user in accordance with the priority. In such a case, a plurality of advertisements are received and stored in the storage 34 and the number of times of display to the user is changed in accordance with the priority.

Furthermore, in the above embodiments, the explanation was made by assuming a case where the information for a large number of unspecified users was a normal advertisement, but the present invention is not limited to this. Headline news, regional information, etc. may be distributed other than advertisements. In such cases as well, the same procedures as in the above explanation may be used for the transfer, processing, and display/reproduction of information.

Also, in the above embodiments, the explanation was made by assuming a case of communication in a cellular wireless communication system, but the same procedures as in the above embodiments may be used for the transfer, processing, and display/reproduction of information in an ordinary cable television network, wired telephone networks, etc.

As explained above, according to the present invention, a communication system capable of broadcasting advertisements and other desired information to a large number of unspecified terminals can be provided.

Further, a communication terminal, applied in such a communication system, capable of receiving broadcasted information and suitably displaying it to users can be provided.

Further, a contents server capable of broadcasting for example advertisements and other desired information to a large number of unspecified terminals can be provided.

What is claimed is:

1. A communication system, comprising:
   a host system;
   a plurality of terminals;
   a communication channel for communicating between said host system and said plurality of terminals; and
   a distribution channel for broadcasting advertisement information from said host system to said plurality of terminals, wherein said advertisement information is received by one of said plurality of terminals between a first time when said one of said plurality of terminals is switched to a stand-by state to receive said communication channel and a second time when said one of said plurality of terminals is switched to an active state.

2. The communication system as set forth in claim 1, further comprising
   a control channel for transferring information regarding predetermined control processing for communication between said host system and said plurality of terminals.

3. The communication system as set forth in claim 1, wherein said host system comprises a server apparatus for storing said advertisement information.

4. The communication system as set forth in claim 1, wherein said plurality of terminals notify said host system of information regarding usage of said advertisement information broadcast over said distribution channel.

5. The communication system as set forth in claim 1, wherein
   a plurality of types of signals each including a content are multiplexed and broadcast over said distribution channel.

6. The communication system as set forth in claim 1, wherein:
   said communication system further comprises a cellular wireless communication system;
   said plurality of terminals comprise cellular wireless communication terminals;
   said host system comprises a base station; and
   said base station and said cellular wireless communication terminals are connected by a plurality of channels including a cellular control channel for transferring information for predetermined control processing, a cellular communication channel for communication between said host system and said cellular wireless communication terminals, and a cellular distribution channel for broadcasting said advertisement information to said cellular wireless communication terminals.

7. A communication terminal for use in a communication system including a host system and a plurality of communication terminals connected to said host system, comprising:
   channel means connected to said host system and including a communication channel for communication between said host system and said plurality of terminals and a distribution channel for broadcasting advertisement information from said host system to said plurality of terminals, wherein said advertisement information is received by said communication terminal between a first time when said communication terminal is switched to a stand-by state to receive said communication channel and a second time when said communication terminal is switched to an active state;
   receiving means for receiving from said channel means said advertisement information via said distribution channel;
   storage means for storing said advertisement information received by said receiving means;
   output means for outputting said advertisement information stored in said storage means in a predetermined form; and
   control means for making said output means output said advertisement information stored in said storage means in a predetermined period.

8. The communication terminal as set forth in claim 7, wherein
   said control means makes said output means output said advertisement information stored in said storage means while the communication terminal is processing and waiting for a new operation.

9. The communication terminal as set forth in claim 7, wherein
   said control means makes said output means output said advertisement information stored in said storage means while the communication terminal is waiting to receive information regarding said communication via said communication channel.

10. The communication terminal as set forth in claim 7, wherein the communication terminal includes an off state, said stand-by state, and said active state.

11. The communication terminal as set forth in claim 7, further comprising:

output notification means for outputting notification information regarding usage of said advertisement information to said host system when said advertisement information is output from said output means.

12. The communication terminal as set forth in claim 7, wherein a plurality of types of signals each including a content are multiplexed and broadcast over said distribution channel, and said receiving means demultiplexes said multiplexed signal by a predetermined method.

13. The communication terminal as set forth in claim 7, wherein said plurality of communication terminals comprises cellular wireless communication terminals.

* * * * *